Nov. 9, 1965   L. R. PEASLEE   3,217,234
PHASE SPLITTING CIRCUIT
Filed July 28, 1961
FIG. 1
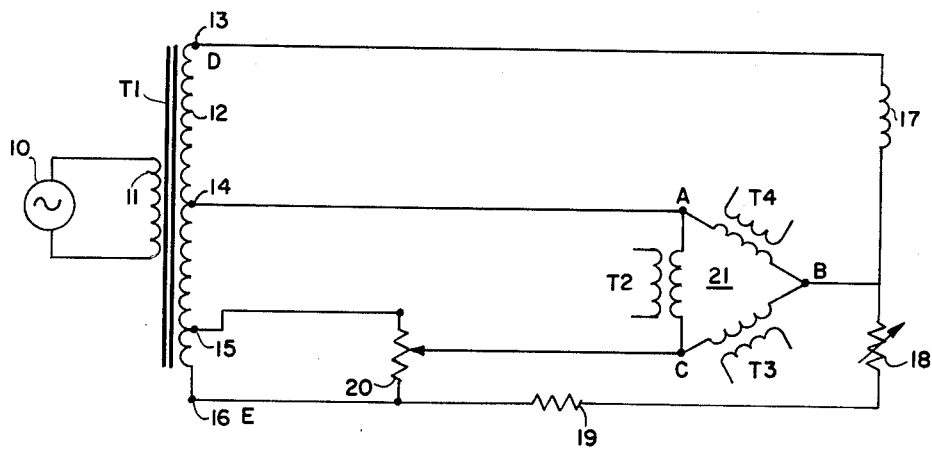
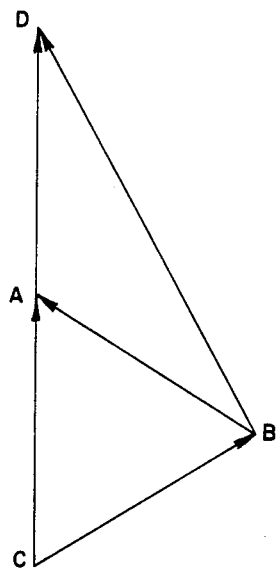
FIG. 2
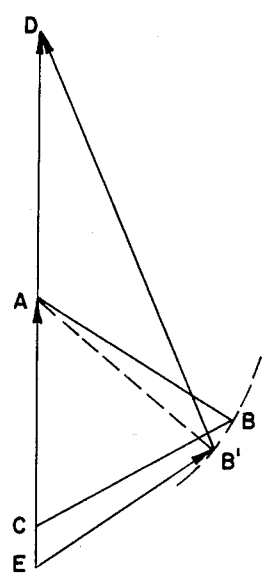
FIG. 3
INVENTOR
LAWRENCE R. PEASLEE
BY *Robert R. Strack*
ATTORNEY

United States Patent Office 3,217,234
Patented Nov. 9, 1965

3,217,234
PHASE SPLITTING CIRCUIT
Lawrence R. Peaslee, Waynesboro, Va., assignor to General Electric Company, a corporation of New York
Filed July 28, 1961, Ser. No. 127,548
2 Claims. (Cl. 321—58)

This invention relates to the conversion of a single phase alternating voltage to a multiphase alternating voltage, and in particular to circuits for developing a three phase output from a single phase input.

Phase splitting, or the conversion of a single phase voltage to a plurality of voltage phases having a specific and balanced relationship therebetween, has become increasingly important in conjunction with the development of power generating equipment.

It is well known that phase shift may be achieved by making use of the feature of reactive components that the current therethrough is not in phase with the voltage thereacross. In fact, many arrangements have been devised for the static generation of a plurality of phases of voltage from a single phase voltage by using various combinations of reactive components. These prior arrangements, however, generally require a plurality of reactive components or are not easily adjusted to overcome errors resulting from component tolerance, incorrect frequency, or circuit loading.

It is an object of the present invention to provide a static phase splitting circuit which yields a balanced three phase voltage output.

Another object of the invention is to provide a phase splitting circuit including means for easily adjusting the phase splitting components in order to insure a balance output.

Another object of the invention is to provide a circuit for converting a single phase voltage to a three phase voltage wherein wide variations in input voltage amplitude do not disturb the phase displacement of the output voltages.

In accordance with the circuit illustrated hereinafter, in one embodiment of the invention comprises an input transformer having a center tapped secondary winding serially connected with a circuit containing a single inductive element and an adjustable resistance means for developing a pair of voltages substantially 90° displaced with respect to one another. By selectively extracting voltages from points in this circuit configuration, a balanced three phase voltage is obtained. As illustrated, three transformers having their primary windings delta connected are used to make the three phase power available to an output circuit. Two terminals of the delta configuration are serially connected with the inductive element across one-half of the input transformer secondary winding and the third terminal is connected via a potentiometric device to the remaining end of the secondary winding.

In operation, as hereinafter described, a balanced output is obtained by selectively positioning the sliding contact of the potentiometric device and the resistance value of the aforementioned adjustable resistance until the voltage across each primary winding is equal. At this time a balanced three phase voltage exists.

The novel features of the invention are set forth with particularity in the appended claims. The invention itself, however, both as to its organization and method of operation, together with further objects and features thereof, may best be understood by reference to the following description taken in conjunction with the accompanying drawing wherein:

FIG. 1 is a circuit schematic of one form of the invention;

FIG. 2 is an idealized vector diagram of the voltages appearing across pertinent circuit elements in FIG. 1; and FIG. 3 is a vector diagram descriptive of the actual circuit operation and the effects of varying the adjustable elements therein.

The illustrative circuit in FIG. 1 will be seen to comprise a single phase alternating current input 10 supplying a transformer T1 having primary 11 and center tapped secondary winding 12. As illustrated, secondary winding 12 has end terminals 13 and 16, a center tap 14, and a tap 15 relatively close to end terminal 16. A series circuit comprising an inductive reactance 17, a variable resistance 18, and a resistor 19 is connected between end terminals 13 and 16. These elements are effective to yield a three phase output at the secondary windings of three transformers T2, T3, and T4, which compose the output circuit 21. The primary windings of output transformers T2, T3, and T4 are connected in a delta configuration wherein the terminals or junction points have been designated A, B, and C. As shown, terminal A is connected to center tap 14 of secondary winding 12, terminal B is connected to the junction of inductance 17 and variable resistance 18, and terminal C is connected to the slider of a potentiometer 20 which bridges tap 15 and end terminal 16 of secondary winding 12.

The vector diagram in FIG. 2 represents the ideal conditions that would be experienced if reactor 17 were a pure inductance, resistors 19 and 18 were pure resistances, and the output transformers T2, T3, and T4 and their loads exerted no reactive or resistive influence upon circuit operation. For descriptive brevity, the notations for terminals 13 and 16 on secondary winding 12 have been changed to D and E respectively in the vector diagrams.

Under ideal conditions, assuming that the slider of potentiometer 20 is connected to end terminal 16 of transformer secondary 12, voltage vector CD in FIG. 2 represents the voltage across secondary winding 12 and center point A represents the voltage appearing at center tap 14. Vector CB and vector BD represent the voltage across resistors 19 and 18, and inductance 17 respectively. Because of the resistive and reactive nature of these elements, vector CB is orthogonal to vector BD. The ratio of reactance to resistance is adjusted by variation of variable resistance 18 so that the current through resistances 18 and 19 lags the secondary winding voltage CD by 60°. Because the resistance is assumed pure, the voltage vector CB consequently lags the voltage CD by 60°. A 30°–60°–90° triangle has consequently been formed by the vectors. Since point A is at the midpoint of vector CD, the voltage vector created between points B and A completes an equilateral triangle ACB. The voltages represented by the vectors CB, BA, and AC (where $AC = -CA$) form a balanced three phase delta system. These voltages are applied to output circuit 21.

It is, of course, unrealistic to expect perfect reactors and resistances. In addition, the use of a transformer output introduces reactive components across the resistive legs of the circuit in FIG. 1. The effect of these actual deviations from the above described perfect circuit elements is to modify the 90° angle between the resistive and reactive components so that the actual angle will always be greater than 90°. This condition is illustrated by the angle ED'D in FIG. 3 wherein the voltage across resistances 18 and 19 in parallel with the primary of transformer T3 is represented by vector EB' and the voltage across imperfect inductance 17 is represented by vector B'D. Obviously, with imperfect elements the vector triangle EB'D is not 30°–60°–90°, and consequently, voltage vectors EB', B'A, and EA do not form the equilateral triangle required for a balanced three phase output. It will be recognized that now, adjustment of variable resistance 18 alone, will not reestablish a 30°–60°–90° triangle because angle EB'D is obtuse due to the necessary imperfections of the elements.

Adjustment of potentiometer 20 and variable resistance 18 makes possible a rebalancing and establishment of a discrete 120° displaced three phase output. In successive steps, variable resistance 18 and potentiometer 20 are adjusted until the magnitude of voltages across each primary winding of the output transformers are equal. In the vector diagrams of FIG. 3, adjustment of variable resistance 18 is equivalent to movement of point B' (where B' represents the voltage at point B with resistance 18 improperly adjusted) along the locus of points nearly equidistant from point A. In other words, adjustment of variable resistance 18 causes point B' to describe an arc of approximately constant radius about point A. Thus, the voltages B'A and CA remain essentially constant while the voltage CB varies. Modifications of slider position on potentiometer 20 has the effect of changing the voltage CA but has essentially no effect upon voltage B'A and CB'. By adjusting both variable resistance 18 and potentiometer 20, a proper point, B, is attained and equilateral triangle ACB is again formed. Consequently, a balanced three phase voltage is produced at terminals ABC and on the secondary windings of transformers T2, T3, and T4.

Successive adjustments of variable resistance 18 and potentiometer 20 are effective at all times to balance the output across output circuit 21. Should the input frequency change to a different state during operation, it is merely necessary to readjust the variable elements 18 and 20 to regain the balanced output desired.

A single illustrative embodiment of the invention has been described. Numerous modifications are possible which will yield similar results. Examples of typical modifications follow. It is not essential that a center tapped transformer be employed if a tapping means is provided wherein the voltage from transformer terminal 13 to the tap is greater than the voltage from transformer terminal 16 to the tap. Resistor 19 may be eliminated and variable resistance 18 compensated in value for the elimination. Potentiometer 20 may be connected between terminals 14 and 16 in order to eliminate tap 15. In fact, potentiometer 20 may be replaced by a plurality of taps or a slider on transformer secondary 12. It may also be found desirable to adjust the value of inductance 17 rather than resistor 18. Finally, a delta output may be used which does not include transformers T2, T3, and T4. The invention contemplates circuits of the nature suggested above as well as that specifically described and illustrated in FIG. 1.

In accordance with the above, while there has been shown a particular embodiment of the invention it will, of course, be understood that it is not wished to be limited thereto since modifications may be made both in the circuit arrangement and in the instrumentalities employed and it is contemplated in the appended claims to cover any such modifications as fall within the true spirit and scope of the invention.

What is claimed as new and desired to be secured by Letters Patent of the United States is:

1. In a circuit for converting a single phase voltage to a three phase voltage, a source of alternating voltage, means bridging said source and producing individual voltages having phase relations of substantially 30°-leading and 60°-lagging with respect to said alternating voltage, means for varying the amplitude of said substantially 60°-lagging voltage, a three phase delta connected load having two branches thereof individually supplied by voltages of equal amplitude from said alternating voltage and said 60°-lagging voltage respectively and having the third branch thereof supplied by the serial combination of said voltages of equal amplitude.

2. A circuit as defined in claim 1 in combination with means for varying the amplitude of said substantially 60° lagging voltage.

References Cited by the Examiner
UNITED STATES PATENTS

| 620,989 | 3/99 | Steinmetz et al. | 321—58 |
| 2,423,348 | 7/47 | Short | 321—58 |
| 2,480,576 | 8/49 | Helber | 321—57 |

FOREIGN PATENTS

| 1,141 | 1899 | Great Britain. |

LLOYD McCOLLUM, *Primary Examiner.*
SAMUEL BERNSTEIN, *Examiner.*